(12) United States Patent
Shimizu

(10) Patent No.: US 9,804,831 B2
(45) Date of Patent: Oct. 31, 2017

(54) CONTROL DEVICE, DISPLAY DEVICE, FIRMWARE UPDATING METHOD, AND FIRMWARE UPDATING PROGRAM

(71) Applicant: Takashi Shimizu, Tokyo (JP)

(72) Inventor: Takashi Shimizu, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 14/651,186

(22) PCT Filed: Dec. 20, 2012

(86) PCT No.: PCT/JP2012/083017
§ 371 (c)(1),
(2) Date: Jun. 10, 2015

(87) PCT Pub. No.: WO2014/097436
PCT Pub. Date: Jun. 26, 2014

(65) Prior Publication Data
US 2015/0331688 A1 Nov. 19, 2015

(51) Int. Cl.
G06F 9/44 (2006.01)
G06F 9/445 (2006.01)
G09G 5/36 (2006.01)

(52) U.S. Cl.
CPC ............. *G06F 8/65* (2013.01); *G06F 8/665* (2013.01); *G09G 5/363* (2013.01); *G09G 2360/125* (2013.01)

(58) Field of Classification Search
USPC ........................................................ 717/170
See application file for complete search history.

(56) References Cited

U.S. PATENT DOCUMENTS

2008/0287058 A1* 11/2008 Nahm .................. G06F 8/65
455/3.02
2010/0186007 A1* 7/2010 Jeong .................. G06F 8/60
717/170
(Continued)

FOREIGN PATENT DOCUMENTS

CN 1630329 A 6/2005
CN 102662699 A 9/2012
(Continued)

OTHER PUBLICATIONS

International Search Report (ISR) (PCT From PCT/ISA/210), in PCT/JP2012/083017, dated Mar. 19, 2013.
(Continued)

*Primary Examiner* — Hang Pan
(74) *Attorney, Agent, or Firm* — McGinn IP Law Group, PLLC.

(57) ABSTRACT

A control device includes: a storage unit that stores own-device version information indicating a version of firmware that an own device has; a version information acquisition unit that imports, from a plurality of control devices, other-device version information indicating a version of firmware that each of the plurality of control devices has; and a version management unit that compares an own-device version indicated by the own-device version information stored in the storage unit with each of a plurality of other-device versions indicated by the other-device version information imported by the version information acquisition unit, when the version management unit determines according to a result of the comparison that the own-device version is older than a newest other-device version in the plurality of other-device versions, the version management unit issuing a transfer request for firmware corresponding to the newest
(Continued)

other-device version, to a control device corresponding to the newest other-device version.

8 Claims, 10 Drawing Sheets

(56) References Cited

U.S. PATENT DOCUMENTS

| | | | | |
|---|---|---|---|---|
| 2010/0199272 | A1* | 8/2010 | Mahajan | G06F 8/67 717/171 |
| 2012/0216183 | A1* | 8/2012 | Mahajan | G06F 8/65 717/170 |
| 2013/0275956 | A1* | 10/2013 | Lai | G06F 8/65 717/170 |

FOREIGN PATENT DOCUMENTS

| | | |
|---|---|---|
| JP | H 08-006796 A | 1/1996 |
| JP | 2001-236233 A | 8/2001 |
| JP | 2007-249748 A | 9/2007 |
| JP | 2008-250770 A | 10/2008 |
| JP | 2012-098906 A | 5/2012 |

OTHER PUBLICATIONS

Chinese Office Action for CN Application No. 201280077773.9, dated Jan. 3, 2017, and English Translation thereof.
Chinese Office Action, dated Jan. 3, 2017, and English Translation thereof.
Chinese Office Action, dated Aug. 24, 2017, in Chinese Application No. 201280077773.9 and Machine English Translation thereof.

* cited by examiner

CONTROL DEVICE, DISPLAY DEVICE, FIRMWARE UPDATING METHOD, AND FIRMWARE UPDATING PROGRAM

TECHNICAL FIELD

The present invention relates to a control device, a display device, a firmware updating method, and a firmware updating program.

BACKGROUND ART

In a multi-display system constituted by combining a plurality of display devices, when a control program (firmware) is updated for each display device, a rewrite process is required for the number of display devices, and an update time becomes long. Therefore, a technique of rewriting the control program held by each of the plurality of display devices constituting the multi-display system, collectively in a short time by an external device is known (for example, see Patent Document 1).

Moreover, at the time of installing the multi-display system, there may be a combination of the display devices in which versions of the firmware of the display device are not the same. Furthermore, in the maintenance of the multi-display system during operation, the display devices having a different firmware version may be mixed. In such a case, by applying a technique described in Patent Document 1, the newest firmware can be transferred to a plurality of display devices from an external device such as a personal computer, so that the firmware is rewritten in the respective display devices.

PRIOR ART DOCUMENTS

Patent Document

[Patent Document 1] Japanese Unexamined Patent Application, First Publication No. 2001-236233

SUMMARY OF THE INVENTION

Problem to be Solved by the Invention

However, in the technique described in Patent Document 1, rewrite of the firmware of all the display devices constituting the multi-display system is carried out simultaneously and collectively. Therefore, when a display device in which the newest firmware has already been written, is included in the multi-display system, a rewrite process of the firmware is carried out even to that display device.

Moreover, it may be time consuming to connect a computer device to the display devices of the multi-display system for the rewrite process of the firmware. Furthermore, when the multi-display system is installed in a state embedded in a wall surface or the like, the rewrite process may be difficult.

The present invention takes into consideration the above circumstances, and provides a control device, a display device, a firmware updating method, and a firmware updating program in which firmware of a plurality of display devices constituting a multi-display system is easily unified to the newest firmware in the display devices.

Means for Solving the Problem

In order to solve the above problems, a control device being one exemplary aspect of the present invention includes: a storage unit that stores own-device version information indicating a version of firmware that an own device has; a version information acquisition unit that imports, from a plurality of control devices, other-device version information indicating a version of firmware that each of the plurality of control devices has; and a version management unit that compares an own-device version indicated by the own-device version information stored in the storage unit with each of a plurality of other-device versions indicated by the other-device version information imported by the version information acquisition unit, and when according to a result of the comparison the own-device version is older than a newest other-device version in the plurality of other-device versions, issues a transfer request for firmware corresponding to the newest other-device version, to a control device corresponding to the newest other-device version.

In order to solve the above problems, a display device being one exemplary aspect of the present invention includes: a storage unit that stores own-device version information indicating a version of firmware that an own device has; a version information acquisition unit that imports, from a plurality of display devices, other-device version information indicating a version of firmware that each of the plurality of display devices has; and a version management unit that compares an own-device version indicated by the own-device version information stored in the storage unit with each of a plurality of other-device versions indicated by the other-device version information imported by the version information acquisition unit, and when according to a result of the comparison the own-device version is older than a newest other-device version in the plurality of other-device versions, issues a transfer request for firmware corresponding to the newest other-device version, to a display device corresponding to the newest other-device version.

In order to solve the above problems, a firmware updating method being one exemplary aspect of the present invention includes: a version information acquisition step of importing, from a plurality of control devices, other-device version information indicating a version of firmware that each of the plurality of control devices has; a comparison step of comparing an own-device version indicated by own-device version information stored in a storage unit with each of a plurality of other-device versions indicated by the other-device version information imported by the version information acquisition unit, the storage unit storing the own-device version information indicating a version of firmware that an own device has; and a version management step of, when according to a result of the comparison in the comparison step, the own-device version is older than a newest other-device version in the plurality of other-device versions, issuing a transfer request for firmware corresponding to the newest other-device version, to a control device corresponding to the newest other-device version.

In order to solve the above problems, a firmware updating program being one exemplary aspect of the present invention causes a computer including a storage unit that stores own-device version information indicating a version of firmware that an own device has, to function as: a version information acquisition unit that imports, from a plurality of control devices, other-device version information indicating a version of firmware that each of the plurality of control devices has; and a version management unit that compares an own-device version indicated by the own-device version information stored in the storage unit with each of a plurality of other-device versions indicated by the other-device version information imported by the version information acquisition unit, and when according to a result of the comparison the own-device version is older than a newest other-device version in the plurality of other-device versions, issues a transfer request for firmware corresponding to the newest other-device version, to a control device corresponding to the newest other-device version.

Effect of the Invention

According to the present invention, the firmware of a plurality of display devices constituting a multi-display system can be easily unified to the newest firmware in the plurality of display devices.

EMBODIMENTS FOR CARRYING OUT THE INVENTION

Exemplary embodiments of the present invention will be described below in detail with reference to the drawings.

First Exemplary Embodiment

Figure 1:
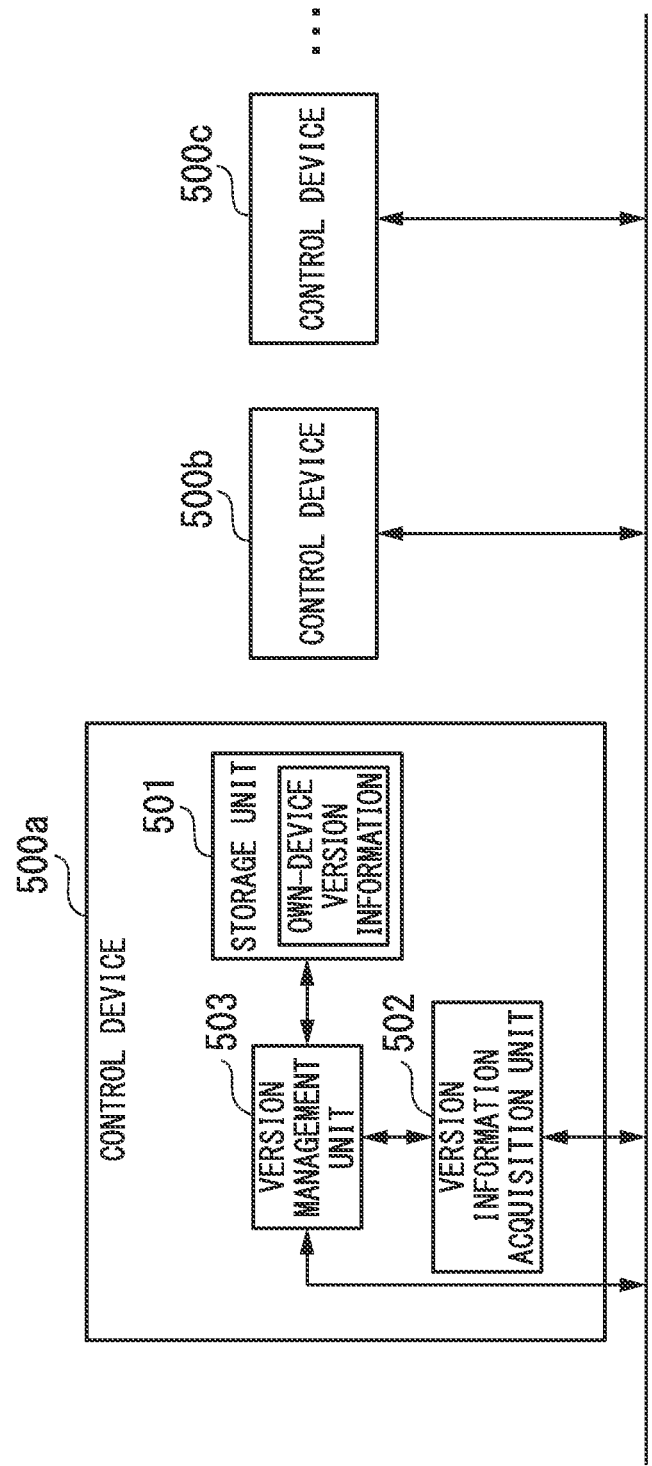
FIG. 1 is a block diagram showing a basic configuration of a control device according to a first exemplary embodiment of the present invention.

FIG. 1 is a block diagram showing a basic configuration of a control device according to a first exemplary embodiment of the present invention. As shown in FIG. 1, a control device 500a includes a storage unit 501, a version information acquisition unit 502, and a version management unit 503. Control devices 500b, 500c, and so on have the same configuration as that of the control device 500a. However, it is assumed that versions of firmware of each of the control device 500a, 500b, 500c, and so on are not unified. The control device 500a is assumed to be an own device, and the control devices 500b, 500c, and so on are assumed to be other devices, and the configuration of the own device will be described as an example. In the description below, each of the control devices 500a, 500b, 500c, and so on may be referred to as a control device 500.

The storage unit 501 stores own-device version information indicating a version of firmware of the control device 500a.

The version information acquisition unit 502 imports other-device version information indicating a version of firmware of a plurality of display devices, from the controls devices 500b, 500c, and so on, being other devices.

The version management unit 503 compares an own-device version indicated by the own-device version information stored in the storage unit 501 with each of a plurality of other-device versions indicated by the other-device version information imported by the version information acquisition unit 502. Then when according to a result of the comparison, the own-device version is older than the newest other-device version in the plurality of other-device versions, the version management unit 503 issues a transfer request for firmware corresponding to the newest other-device version, to any of the control devices 500b, 500c, and so on corresponding to the newest other-device version.

Moreover, when according to the result of the comparison described above, the own-device version is newer than or is equal to the newest other-device version in the plurality of other-device versions, the version management unit 503 transfers the firmware corresponding to the own-device version to any of the control devices 500b, 500c, and so on corresponding to an other-device version in the case where an other-device version older than the own-device version is included in the plurality of other-device versions.

Next is a description of a display device according to the first exemplary embodiment of the present invention. The control device 500 described above is applied to the display device.

Figure 2:
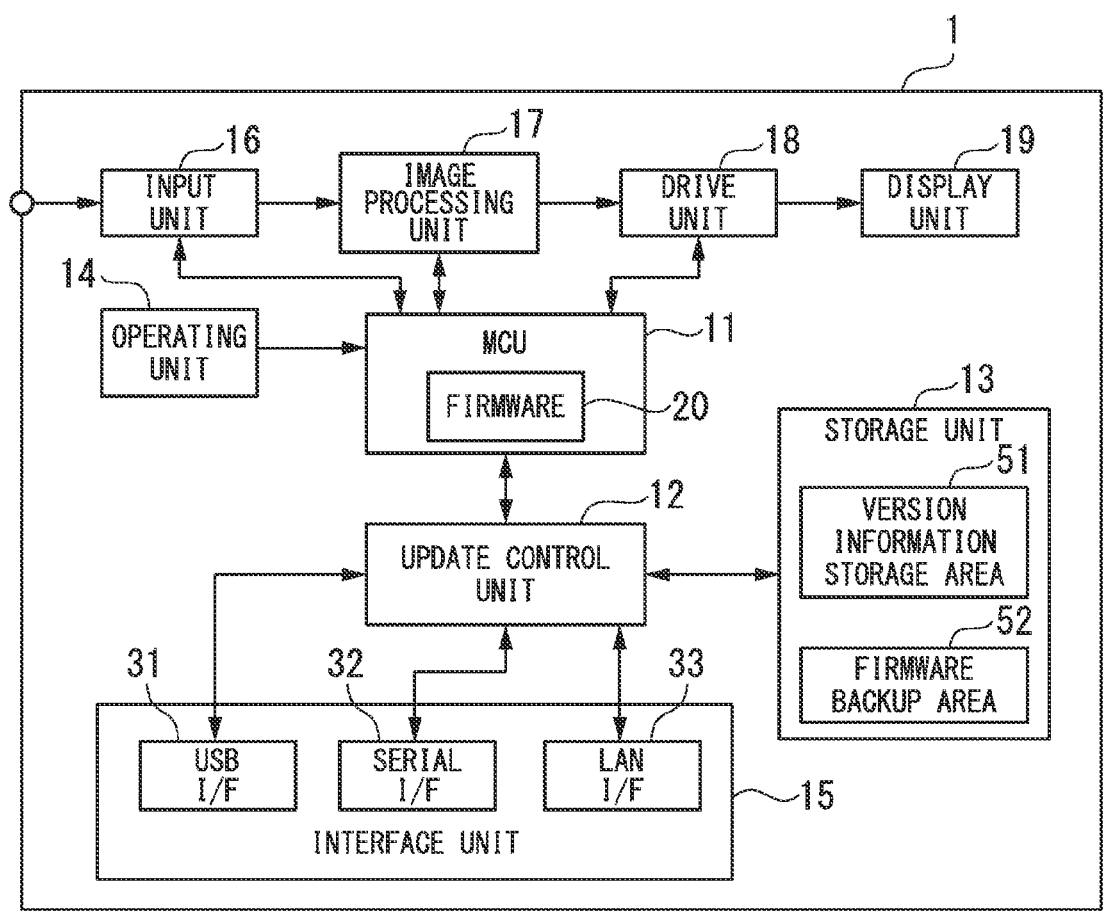
FIG. 2 is a block diagram showing a configuration of a display device according to the same exemplary embodiment.

FIG. 2 is a block diagram showing a configuration of the display device according to the first exemplary embodiment of the present invention. As shown in FIG. 2, a display device 1 includes a MCU (Micro Control Unit) 11, an update control unit 12, a storage unit 13, an operating unit 14, an interface unit 15, an input unit 16, an image processing unit 17, a drive unit 18, and a display unit 19.

The MCU 11 is configured to include, for example, a CPU (Central Processing Unit), a memory, and an input and output unit. Moreover, the MCU 11 includes a firmware memory unit 20 formed of an EEPROM (Electrically Erasable Programmable Read-Only Memory) or a flash memory. The firmware memory unit 20 stores the firmware. The firmware is a program for controlling a basic operation of the display device 1. That is to say, the MCU 11 causes the CPU to execute the firmware to control the entire display device 1. The present exemplary embodiment shows an example in which the firmware memory unit 20 is incorporated in the MCU 11. However, the firmware memory unit 20 may be provided as a separate body from the MCU 11.

The update control unit 12 executes an updating process of the firmware of the MCU 11. The update control unit 12 is configured to include, for example, a CPU and a memory. The updating process of the firmware in the update control unit 12 will be described later.

The storage unit 13 stores version information of the firmware held in the firmware memory unit 20 in the MCU 11, and a backup of the firmware. That is to say, in the present exemplary embodiment, the storage unit 13 includes a firmware version information storage area 51, and a firmware backup area 52. The firmware version information storage area 51 stores version information of the firmware held in the firmware memory unit 20 in the MCU 11. The version information is the own-device version information. The firmware backup area 52 stores the backup of the firmware held in the firmware memory unit 20 in the MCU 11.

By storing the backup of the firmware in the storage unit 13 in advance, when transferring the firmware to other display devices 1, the display device 1 reads the backup from the storage unit 13, and transfers the backup to the other display devices 1. As a result, the display device 1 can transfer the firmware to the other display devices 1 without stopping a multi-display operation of the multi-display system. Moreover, when data of the firmware stored in the firmware memory unit 20 of the display device 1 cannot be accessed due to a breakage or the like, the storage unit 13 can transfer the backup to the firmware memory unit 20 to restore the firmware.

The operating unit 14 receives a user input, and transmits an operation signal thereof to the MCU 11. Upon receipt of the operation signal from the operating unit 14, the MCU 11 operates according to the operation signal. The operating unit 14 may be configured by an infrared remote controller. Moreover, the operating unit 14 may be an OSD (On Screen Display) such that an operation button is superimposed and displayed on a screen.

The interface unit 15 performs data communication with other devices. In the present exemplary embodiment, a USB (Universal Serial Bus) interface 31, a serial interface 32, and a LAN (Local Area Network) interface 33 are provided as the interface unit 15.

The input unit 16 is configured to include a selection circuit of an input path of a video signal and a circuit required for input of the video signal. Moreover, the input unit 16 includes an A/D (Analog to Digital) converter in the case of the input video signal being, for example, an analog signal.

The image processing unit 17 includes a circuit for performing a required process to display the input video signal. For example, the image processing unit 17 includes a circuit for performing adjustment of brightness, color correction processing, and the like. The drive unit 18 includes a driver or the like that drives the display unit 19. The display unit 19 is, for example, a liquid crystal panel or an organic EL (Electro Luminescence), and displays an image.

The display device 1 according to the present exemplary embodiment is used for the multi-display system in which a plurality of display devices 1 is arranged in a horizontal direction and a vertical direction respectively to form one large screen. In the present exemplary embodiment, the respective display devices 1 constituting the multi-display system are connected to each other via a LAN (Local Area Network) interface 33 to constitute a network (see FIG. 4 and FIG. 6). The respective display devices 1 have unique identification information. The identification information is, for example, an IP (Internet Protocol) address or a MAC (Media Access Control) address. The display device 1 performs data communication with other display devices 1 via the network by using the identification information. The LAN interface 33 performs data communication between respective devices constituting the network, for example, by CSMA/CD (Carrier Sense Multiple Access with Collision Detection).

When the updating process of the firmware is to be performed for the four display devices 1 (display devices 1a to 1d), an arbitrary display device is selected from the display devices 1a to 1d, and an update function of the firmware of the display device is activated. The display device in which the update function of the firmware is activated may be any of the display devices 1a to 1d.

Figure 3:
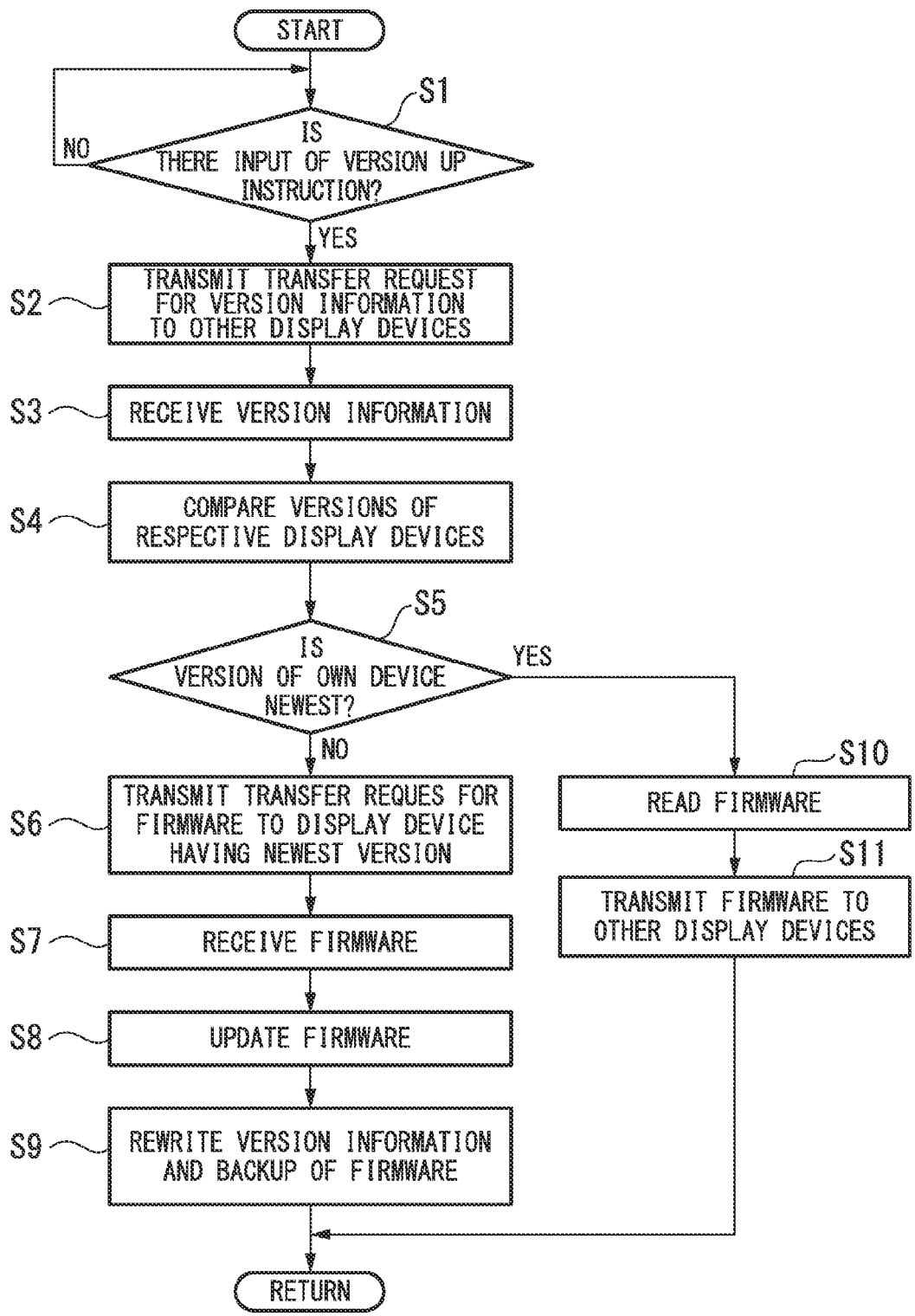
FIG. 3 is a flowchart showing an example of an operation at the time of performing an updating process of firmware.

FIG. 3 is a flowchart showing an operation at the time of performing the update process of the firmware in the display device according to the first exemplary embodiment of the present invention. It is assumed that the display device 1a is the display device in which the update function of the firmware is activated (also referred to as own device), and the display devices 1b, 1c, and 1d are other devices.

In FIG. 3, upon input of an instruction of version up by the operating unit 14 of the display device 1a being the own device (step S1), the update control unit 12 transmits a transfer request for the version information of the firmware to the other display devices 1b, 1c, and 1d on the network (step S2). In response to the transfer request for the version information, the respective display devices 1b, 1c, and 1d supply the version information of their firmware.

Upon receipt of the version information of the firmware from the display devices 1b, 1c, and 1d on the network (step S3), the update control unit 12 compares the version of the firmware of the display device 1a being the own device with the versions of the firmware of the respective display devices 1b, 1c, and 1d (step S4). Then the update control unit 12 determines whether the firmware of the display device 1a is the newest (step S5).

If it is determined that the version of the display device 1a is not the newest (step S5: No), the update control unit 12 transmits to the display device having the firmware of the newest version, a request to transfer the firmware to the other display devices on the network (step S6). Here when there is a plurality of display devices having the firmware of the newest version on the network, the update control unit 12 selects one display device from the display devices having the firmware of the newest version, and transmits the request to transfer the firmware. In this case, the update control unit 12 may select any display device and transmit the request to transfer the firmware, and may select one display device according to, for example, the identification information and transmit the firmware transfer request to that display device.

Upon receipt of the transferred firmware (step S7), the update control unit 12 performs update of the firmware in the firmware memory unit 20 of the MCU 11 by the received firmware (step S8). The update control unit 12 rewrites the version information in the firmware version information storage area 51, and also stores the backup of the updated firmware in the firmware backup area 52 (step S9).

On the other hand, in the process in step S5, if it is determined that the version of the display device 1a is newer or equal to the newest version in the versions of the display devices 1b, 1c, and 1d (step S5: Yes), the update control unit 12 reads the firmware from the firmware backup area 52 (step S10). The update control unit 12 transmits the read firmware to the display device corresponding to that version in the case where a version older than the version of the display device 1a is included in the versions of the display devices 1b, 1c, and 1d (step S11).

Next is a description of the updating process of the firmware of the display device according to the first exemplary embodiment of the present invention. At first a process when the version of the display device 1a in which the update function of the firmware is activated is not the newest version, in the display devices 1a to 1d connected to the network, will be described with reference to FIG. 4 and FIG. 5.

Figure 4:
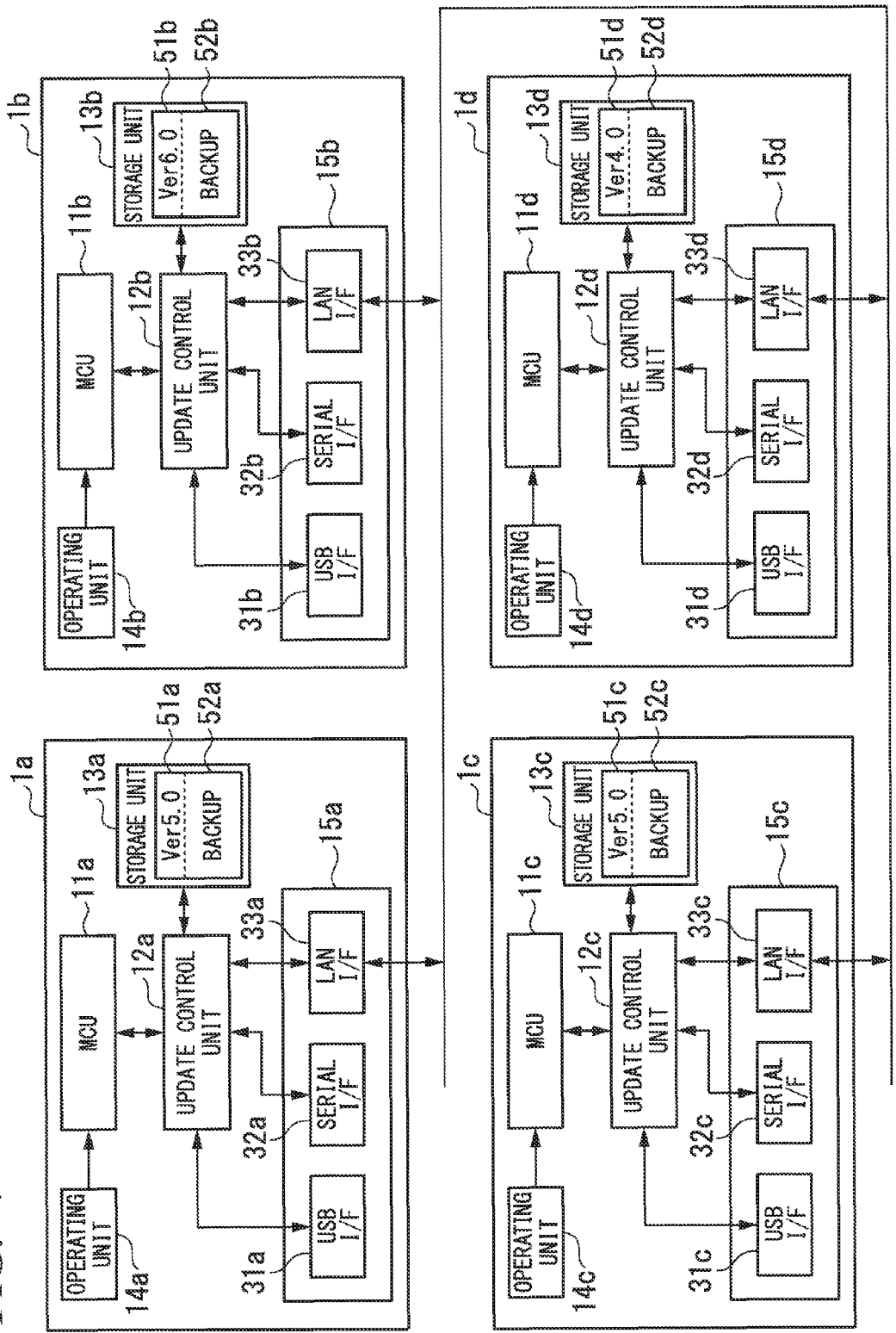
FIG. 4 is an explanatory diagram of an operation when a version of a display device in which an update function of firmware is activated is not the newest version.

FIG. 4 is an explanatory diagram of an operation when the version of the display device 1a in which the update function of the firmware is activated is not the newest version. In FIG. 4, the input unit 16, the image processing unit 17, the drive unit 18, the display unit 19, and the like are not shown for simplifying the explanation. In FIG. 4, it is assumed that the versions of the firmware of the respective display devices 1a, 1b, 1c, and 1d connected to the network are as follows.

Display device 1a: Version Ver. 5.0
Display device 1b: Version Ver. 6.0
Display device 1c: Version Ver. 5.0
Display device 1d: Version Ver. 4.0

Thus, because the firmware of the display device 1a is version Ver. 5.0, and the firmware of the display device 1b is version Ver. 6.0, the version of the firmware of the display device 1a is older than the version of the firmware of the display device 1b.

Figure 5:
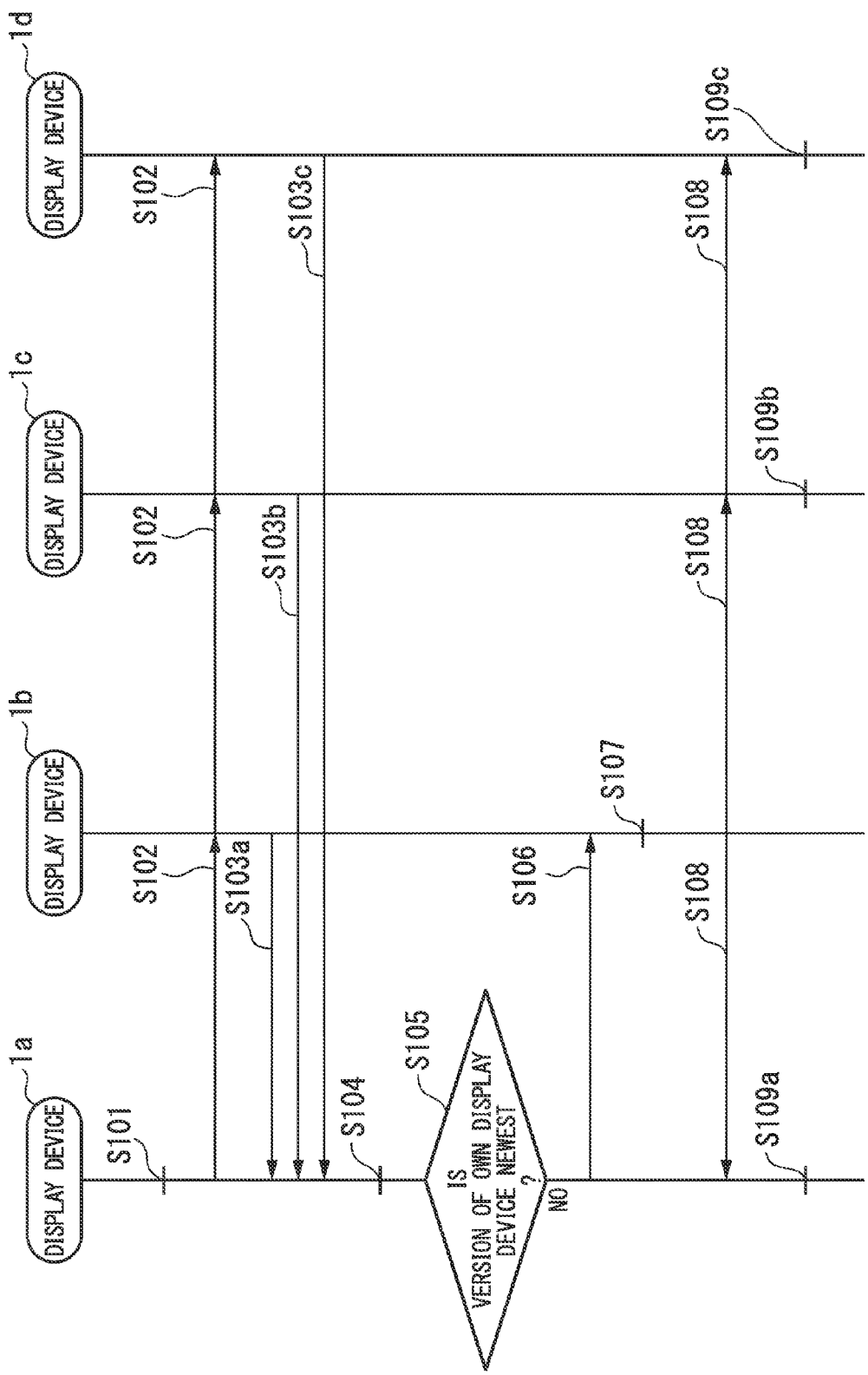
FIG. 5 is a sequence diagram showing a process when the version of the display device in which the update function of the firmware is activated is not the newest version.

FIG. 5 is a sequence diagram showing a process when the version of the display device 1a in which the update function of the firmware is activated is not the newest version. In FIG. 5, when the update function of the firmware of the display device 1a is activated (step S101), an update control unit 12a of the display device 1a transmits a firmware version transfer request by multicast to the display devices 1b, 1c, and 1d on the network (step S102). In response to the version transfer request, update control units 12b, 12c, and 12d of the display devices 1b, 1c, and 1d read the version information from firmware version information storage areas 51b, 51c, and 51d in storage units 13b, 13c, and 13d. Then the update control units 12b, 12c, and 12d transmit the read version information to the display device 1a (steps S103a, S103b, and S103c).

Upon acquisition of the version information of the firmware of the display devices 1b, 1c, and 1d, the update control unit 12a of the display device 1a compares the version of the firmware of the display device 1a with the versions of the firmware of the respective display devices 1b, 1c, and 1d (step S104). Then the update control unit 12a of the display device 1a determines whether the version of the firmware of the display device 1a is the newest (step S105). In this example, the firmware of the display device 1b (version Ver. 6.0) is the newest, and the version of the firmware of the own display device 1a (version Ver. 5.0) is not the newest (step S105: No).

In this case, the update control unit 12a of the display device 1a transmits to the display device 1b having the newest version, a request to transfer the firmware to the other display devices on the network (step S106).

Upon receipt of the firmware transfer request, the update control unit 12b in the display device 1b reads the firmware from a firmware backup area 52b of the storage unit 13b (step S107). Then the update control unit 12b transmits the firmware by multicast to the display devices 1a, 1c, and 1d on the network (step S108). At this time, if of the display devices 1a, 1c, and 1d there is a display device having the newest firmware, the update control unit 12b of the display device 1b does not transmit the firmware to that display device.

Upon receipt of the firmware from the display device 1b, the update control units 12a, 12c, and 12d of the respective display devices 1a, 1c, and 1d update the firmware of MCUs 11a, 11b, and 11d by the received firmware (steps S109a, S109b, S109c). As a result, all the firmware of the respective display devices 1a to 1d is updated to the newest version Ver. 6.0.

Figure 6:
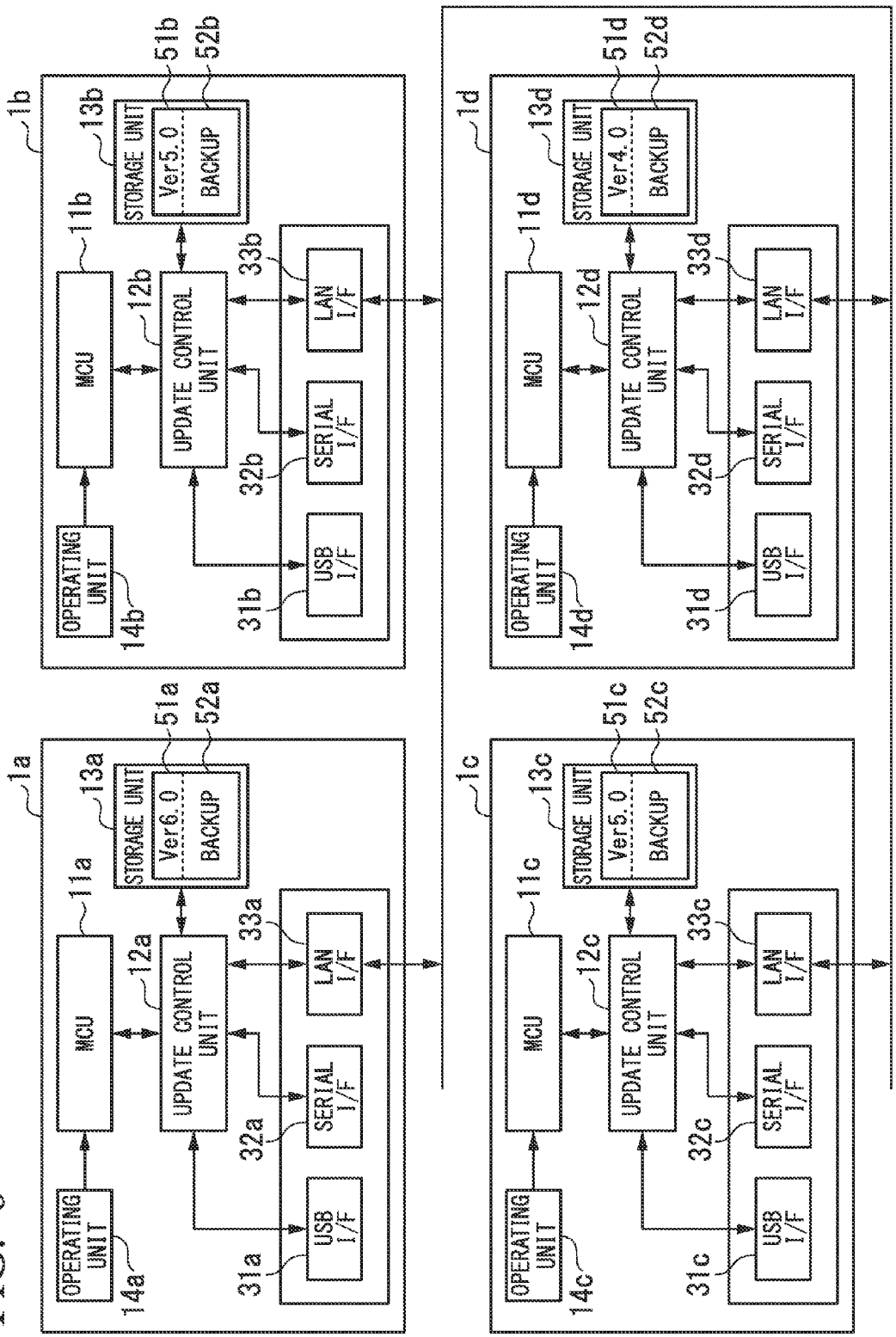
FIG. 6 is an explanatory diagram showing a process when the version of the display device in which the update function of the firmware is activated is the newest.
Figure 7:
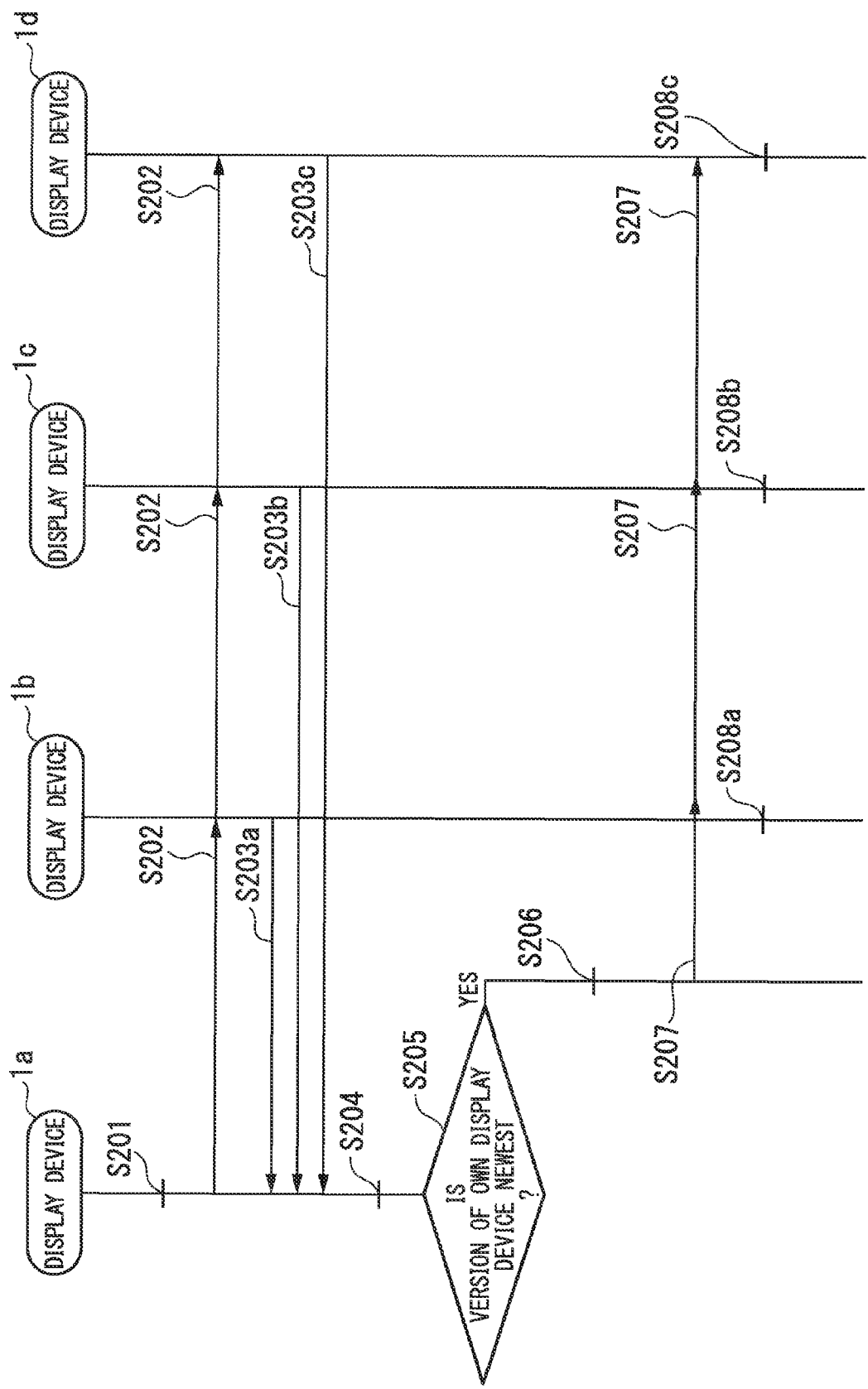
FIG. 7 is a sequence diagram showing a process when the version of the display device in which the update function of the firmware is activated is the newest version.

Next is a description with reference to FIG. 6 and FIG. 7, of a process when the version of the display device in which the update function of the firmware is activated, of the respective display devices connected to the network, is the newest.

FIG. 6 is an explanatory diagram showing the process when the version of the display device in which the update function of the firmware is activated is the newest. In FIG. 6, the versions of the firmware of the respective display devices 1a to 1d are as follows.

Display device 1a: Version Ver. 6.0
Display device 1b: Version Ver. 5.0
Display device 1c: Version Ver. 5.0
Display device 1d: Version Ver. 4.0

Thus, the version of the firmware of the display device 1a is newer than those of the firmware of the display devices 1b, 1c, and 1d.

FIG. 7 is, in this way, a sequence diagram showing the process when the version of the display device in which the update function of the firmware is activated is the newest. In FIG. 7, when the update function of the firmware of the display device 1a is activated (step S201), the update control unit 12a of the display device 1a transmits a firmware version transfer request by multicast to the display devices 1b, 1c, and 1d on the network (step S202). In response to the version transfer request, the update control units 12b, 12c, and 12d of the display devices 1b, 1c, and 1d on the network read the version information from firmware version information storage areas 51b, 51c, and 51d in storage units 13b, 13c, and 13d. Then the update control units 12b, 12c, and 12d transmit the read version information to the display device 1a (steps S203a, S203b, and S203c).

Upon acquisition of the version information of the firmware of the display devices 1b, 1c, and 1d, the update control unit 12a of the display device 1a compares the version of the firmware of the display device 1a with the versions of the firmware of the respective display devices 1b, 1c, and 1d (step S204). Then the update control unit 12a of the display device 1a determines whether the version of the firmware of the display device 1a is the newest (step S205). In this example, the firmware of the display device 1a (version Ver. 6.0) is the newest (step S205: Yes).

In this case, the update control unit 12b of the display device 1a reads the firmware from the firmware backup area 52a of the storage unit 13a (step S206). Then the update control unit 12a transmits the firmware by multicast to the display devices 1b, 1c, and 1d on the network (step S207). At this time, if of the display devices 1b, 1c, and 1d there is a display device having the newest firmware, the update control unit 12a of the display device 1a does not transmit the firmware to that display device.

Upon receipt of the firmware from the display device 1a, the update control units 12b, 12c, and 12d of the display devices 1b, 1c, and 1d update the firmware of MCUs 11b, 11c, and 11d by the received firmware (steps S208a, S208b, S208c). As a result, all the firmware of the respective display devices 1a to 1d is updated to the newest version Ver. 6.0.

As described above, according to the exemplary embodiment of the present invention, at the time of performing the updating process of the firmware, the update control unit 12a of the display device 1a performs communication with the respective display devices 1b, 1c, and 1d via the network to acquire the version information from the display devices 1b, 1c, and 1d. Then the update control unit 12a compares the version of the firmware of the display device 1a with the versions of the firmware of the display devices 1b, 1c, and 1d. If the version of the display device 1a is older than the newest version in the versions of the display devices 1b, 1c, and 1d, the update control unit 12a transmits a firmware transfer request to the display device corresponding to that newest version. If the version of the display device 1a is newer than or equal to a newest version in the versions of the display devices 1b, 1c, and 1d, the update control unit 12a transfers the firmware of the display device 1a to the display device corresponding to an version in the case where a version older than the version of the display device 1a is included in the versions of the display devices 1b, 1c, and 1d. As a result, all the firmware of the display devices 1a to 1d connected to the network can be updated to the newest version. Moreover, according to the exemplary embodiment of the present invention, the firmware is not updated with respect to the display device already having the firmware of the newest version.

The example described above shows a case in which when an instruction of version up is input by the operation of the operating unit 14 of an arbitrary display device (for example, display device 1a) in a state with all the display devices 1a to 1d constituting the multi-display system being powered on, the update function of the firmware is activated. Activation of the update function of the firmware may be performed by the operation of a device such as a personal computer connected to outside, other than by the input from the operating unit 14.

Moreover, by setting such that all the display devices 1a to 1d constituting the multi-display system are powered on simultaneously or in conjunction therewith, then when an arbitrary display device (for example, the display device 1a) is powered on, the display device may activate the update function of the firmware.

Figure 8:
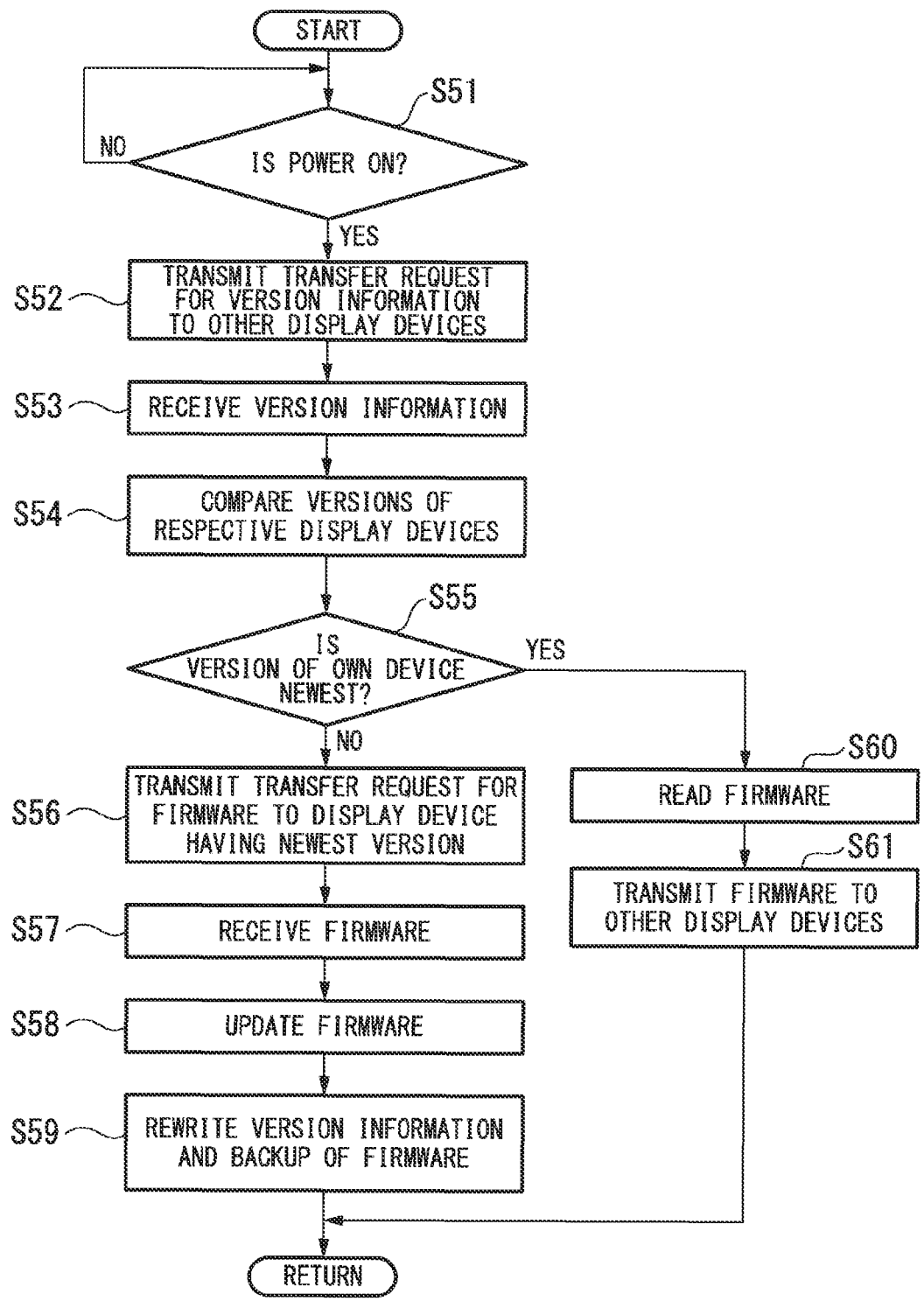
FIG. 8 is a flowchart showing another example of the operation at the time of performing the updating process of the firmware.

For example, when all the display devices 1a to 1d are powered on, then as shown in the flowchart in FIG. 8, the update control unit 12a of the display device 1a detects whether power is on (step S51), and when power is on, may activate the update function of the firmware. In FIG. 8, processes in steps S52 to S61 are the same as the processes in steps S2 to S11 in FIG. 3, and hence, explanation thereof is omitted. Thus, if the update function of the firmware is activated by detecting power on, all the versions of the firmware of the respective display devices connected to the network can be updated to the newest version without requiring a user operation. When any of the display devices (for example, the display device 1d) of all the display devices 1a to 1d constituting the multi-display system is not powered on, the update process of the firmware is performed for the display devices 1a to 1c.

Modified Example of First Exemplary Embodiment

Figure 9:
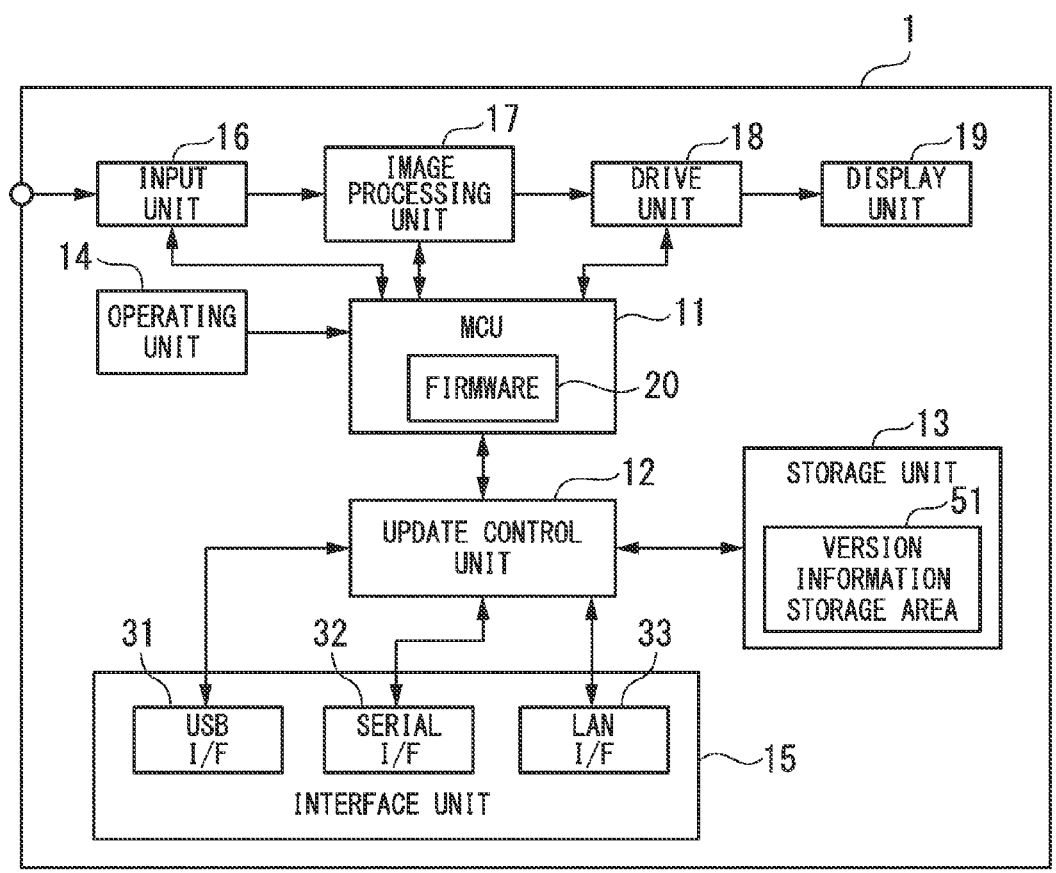
FIG. 9 is a block diagram showing a configuration of a display device according to a modified example of the first exemplary embodiment of the present invention.

FIG. 9 is a block diagram showing a modified example of the first exemplary embodiment of the present invention. As shown in FIG. 9, the display device 1 according to the modified example has a configuration in which the firmware backup area 52 is deleted from the storage unit 13 of the display device 1 according to the first exemplary embodiment.

In the multi-display system configured by using the display devices 1a to 1d having the configuration of FIG. 9, a process when the display device 1a is designated as the own device, and the display devices 1b, 1c, and 1d are designated as other devices will be described.

When the display device 1a receives the firmware from any of the display devices 1b, 1c, and 1d to update the firmware, an update control unit 112 of the display device 1a executes a process of performing format conversion while receiving the transferred firmware, and updating the firmware in a firmware memory unit 120.

Moreover if the firmware of the display device 1a is the newest, the update control unit 12 of the display device 1a directly reads the firmware from the firmware memory unit 20 of the MCU 11. Then the update control unit 12 converts the read firmware into a transfer format, for example, a Hex format. Then the update control unit 12 transmits the format-converted firmware to the display device corresponding to that version in the case where a version older than the version of the display device 1a is included in the versions of the display device 1b, 1c, and 1d. The other configuration is the same as that of the first exemplary embodiment described above.

In this way, by not providing the firmware backup area 52 in the storage unit 13, and reading the firmware from the software memory unit 20, the capacity of the storage unit 13 can be reduced by the amount of the firmware backup area 52.

In the first exemplary embodiment and the modified example thereof, all the display devices constituting the multi-display system have the same configuration. Moreover the display device having the firmware of the newest version transfers the firmware to the display device having the firmware of an older version than the newest version, to unify the firmware of all the display devices constituting the multi-display system to the newest version. At this time, if a display device already written with the newest firmware is included in the multi-display system, the rewrite process of the firmware is not performed with respect to that display device.

By constituting the display devices in this manner, then according to the first exemplary embodiment and the modified example thereof, by selecting any of the display devices to activate the update function of the firmware, the firmware of all the display devices can be easily unified to the newest version. Consequently, management of the display devices constituting the multi-display system is facilitated.

Second Exemplary Embodiment

A second exemplary embodiment of the present invention is an example in which, in a plurality of display devices constituting a multi-display system, one display device in which the update function of firmware is activated is restricted to a particular device having an update control function of the firmware. Here a display device 1a in which the update function of the firmware is activated is referred to as parent device, and a plurality of other display devices 1b, 1c, and 1d are respectively referred to as child devices.

Figure 10:
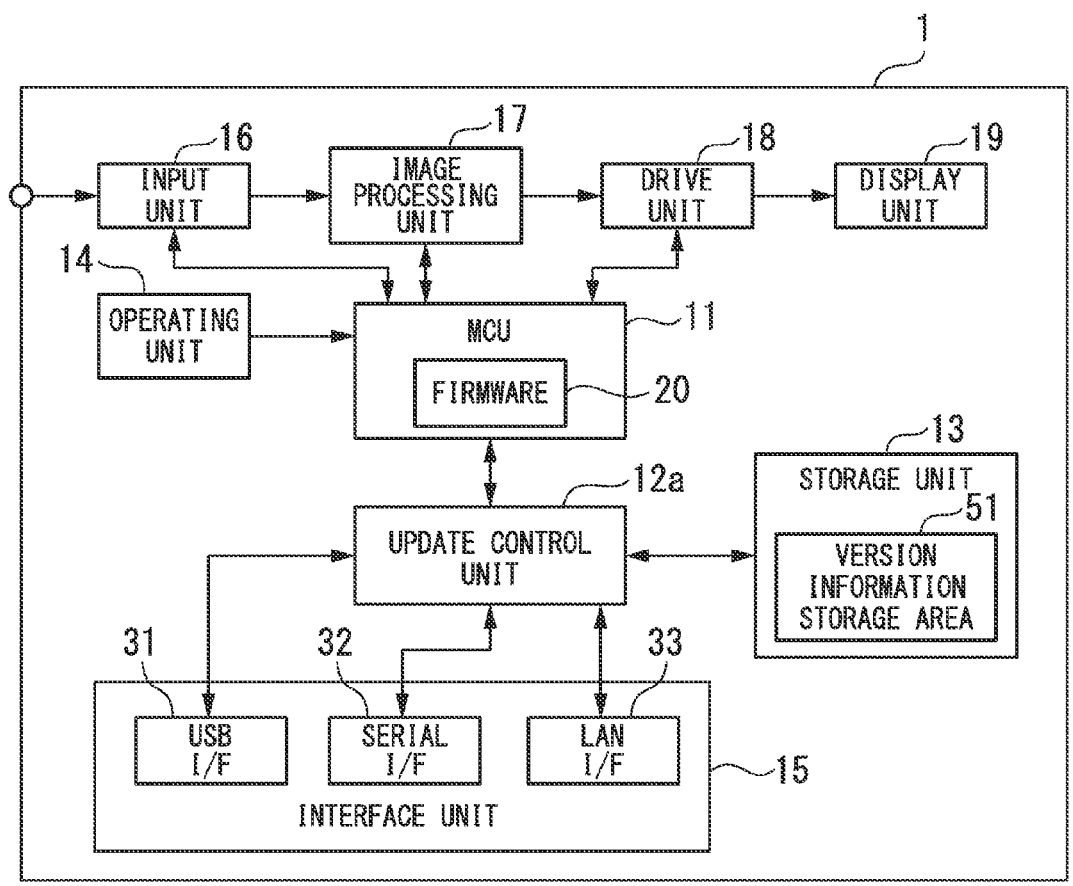
FIG. 10 is a block diagram showing a configuration of a display device according to a second exemplary embodiment of the present invention.

The configuration of the display device 1a being the parent device is the same as that of the display device 1a in the first exemplary embodiment shown in FIG. 2. On the other hand, as shown in FIG. 10, the display devices 1b, 1c, and 1d being child devices have a configuration in which the update control unit 12 is changed to an update control unit 12a in the display devices 1b, 1c, and 1d in the modified example of the first exemplary embodiment.

The update control unit 12a in the child device has a function of returning version information of the firmware of the own device in response to a version information transfer request supplied from the parent device. Moreover the update control unit 12a has a function of importing the newest firmware supplied from the parent device and updating the firmware of the own device by the newest firmware. Furthermore, the update control unit 12a has a function of transferring the firmware of the own device to the parent device in response to the firmware transfer request supplied from the parent device.

The parent device is arranged, for example, on a corner of the multi-display system or at an edge portion of a matrix configuration. Alternatively, the parent device is arranged at a position closest to a signal source or a control device. The child devices are arranged at arbitrary positions.

When the update function of the firmware of the display device 1a being the parent device is activated, the update control unit 12 of the display device 1a transmits a version information transfer request to all the display devices 1b, 1c, and 1d being the child devices. The update control unit 12 of the display device 1a collects responses from the respective display devices 1b, 1c, and 1d. Then the update control unit 12 of the display device 1a compares the version information of the own device stored in the storage unit 13 with the version information acquired from the respective display devices 1b, 1c, and 1d to specify the newest version information.

[1] A Case in which the Version of Firmware of the Parent Device is Newest

When the version indicated by the version information stored in the storage unit 13 of the display device 1a being the parent device is the newest version, the update control unit 12 of the display device 1a reads the backup in the firmware backup area 52, and converts the backup to the transfer format. Then the update control unit 12 transmits the format-converted backup to the display devices 1b, 1c, and 1d. The display devices 1b, 1c, and 1d having received the firmware, respectively update the firmware of the own device and the version information in a version information storage area 151. At this time, if there is a display device having the newest firmware in the display devices 1b, 1c, and 1d, the update control unit 12 of the display device 1a does not transmit the backup to that display device.

[2] A Case in which the Version of Firmware of the Parent Device is Not Newest

If the version indicated by the version information stored in the storage unit 13 of the display device 1a being the parent device is not the newest version, the update control unit 12 of the display device 1a transmits a newest firmware transfer request to any of the child devices that have returned the version information indicating the newest version. Then the update control unit 12 imports the firmware supplied from the child device that has received that newest firmware transfer request. Then the update control unit 12 updates the firmware of the own device and the version information stored in the version information storage area 51 by the imported firmware.

Moreover, if a version older than the version indicated by the updated own device version information is included in the collected pieces of version information of the display devices 1b, 1c, and 1d, the update control unit 12 of the display device 1a transfers the newest firmware to the display device that has the version information indicating that old version. Then the display device having received the newest firmware updates the firmware of the own device and the version information stored in the version information storage area 151.

As described above, in the present exemplary embodiment, in the multi-display system including one parent device capable of activating the update function of the firmware, and a plurality of child devices, the firmware of all the display devices can be easily updated to the newest state.

While the update control unit 12 of the parent device has the update control function, the function of the update control unit 12a of the child devices is limited, and hence can be applied to a general-purpose display device. Accordingly, at the time of constituting a large scale multi-display system, cost reduction can be achieved.

As the parent device in the present exemplary embodiment, the display device shown in FIG. 9 can be applied.

As described above, according to the respective exemplary embodiments of the present invention, a computer device need not be connected to the respective display devices of the multi-display system in order to perform the rewrite process of the firmware. As a result, workability when the multi-display system is installed in a state embedded in a wall surface or the like is excellent, and serviceability is also excellent.

In the above described exemplary embodiments, update of the firmware of the MCU 11 is controlled by using the update control unit 12. However, the MCU 11 may control update of the own firmware.

Moreover, while in the above described exemplary embodiments, a case in which the firmware of a plurality of display devices constituting the multi-display system is updated has been explained, they can be similarly applied to a case in which various programs of a plurality of control devices connected to a network are updated.

Furthermore, the functions of a part of the control device and the display device, which are the exemplary embodiments described above, may be realized by a computer. In this case, it may be realized in a manner in which a firmware updating program for realizing the control device and the display device is recorded on a computer-readable recording medium, the firmware updating program recorded on the recording medium is read by a computer system, and the computer system executes it. The computer system includes an operating system (OS) and hardware of peripheral devices. Moreover, the computer-readable recording medium is a portable recording medium such as a flexible disk, a magneto-optical disk, an optical disk, or a memory card, or a storage device such as a magnetic hard disk or a solid-state drive provided in the computer system. Furthermore, the computer-readable recording medium may include one that dynamically holds a program for a short time such as a communication line when the program is transmitted via a computer network such as the Internet, a telephone line, or a mobile phone network, or one that holds the program for a certain time such as a volatile memory in the computer system, which is a server device or a client in that case. Furthermore, the firmware updating program may be a program for realizing a part of the functions described above, and may be a program that realizes the above described functions by a combination with a program already recorded in the computer system.

The exemplary embodiments of the present invention have been described in detail with reference to the drawings. However, the specific configuration is not limited to the exemplary embodiments thereof, and designs and the like without departing from the scope of the present invention are also included.

REFERENCE SYMBOLS

1 Display device
11 MCU
12, 12a Update control unit
13 Storage unit
15 Interface unit
33 LAN interface
51 Firmware version information storage area
52 Firmware backup area
501 Storage unit 502 Version information acquisition unit
503 Version management unit

The invention claimed is:
1. A control device, comprising:
a storage unit that stores own-device version information indicating a version of firmware that an own device has and a backup of the firmware that the own device has;
a processor of a computer executing a version information acquisition unit that imports, from a plurality of control devices among a control device group including the own device and the plurality of control devices, other-device version information indicating an other-device version of firmware running on each of the plurality of control devices; and
a version management unit that compares an own-device version indicated by the own-device version information stored in the storage unit with each of a plurality of other-device versions indicated by the other-device version information imported by the version information acquisition unit,
when the version management unit determines according to a result of the comparison that the other-device version of a first control device included in the plurality of control devices is newest among the plurality of other-device versions and the own-device version is older than the other-device version of the first control device, the version management unit requesting the first control device to transfer, to the own device and all of control devices of which the other-device version is older than the other-device version of the first control device among the plurality of control devices, firmware of which the other-device version is newest,
wherein, when the version management unit determines according to the result of the comparison that the own-device version is newer than or equal to an other-device version that is newest among the plurality of other-device versions, the version management unit transfers the backup of the firmware, which is read out from the storage unit and corresponds to the own-device version, to all of control devices of which the other-device version is older than the own-device version among the plurality of control devices.
2. The control device according to claim 1, further comprising:
an update unit that imports firmware supplied from the first control device, the update unit executing an update process by using the imported firmware, the update unit updating the own device version information stored in the storage unit by using version information indicating a version of the imported firmware.
3. The control device according to claim 1, wherein only version information is first received from each of the plurality of the control devices to perform a version comparison with the own-device version.
4. The control device according to claim 1, wherein the first control device transfers by multicast the firmware of which the other-device version is newest.
5. A display device, comprising:
a storage unit that stores own-device version information indicating a version of firmware that an own device has and a backup of the firmware that the own device has;
a processor of a computer executing a version information acquisition unit that imports, from a plurality of display devices among a display device group including the own device and the plurality of display devices, other-device version information indicating an other-device version of firmware running on each of the plurality of display devices; and
a version management unit that compares an own-device version indicated by the own-device version information stored in the storage unit with each of a plurality of other-device versions indicated by the other-device version information imported by the version information acquisition unit,
when the version management unit determines according to a result of the comparison that the other-device version of a first display device included in the plurality of display devices is newest among the plurality of other-device versions and the own-device version is older than the other-device version of the first display device, the version management unit requesting the first display device to transfer, to the own device and all of display devices of which the other-device version is older than the other-device version of the first display device among the plurality of display devices, firmware of which the other-device version is newest,
wherein, when the version management unit determines according to the result of the comparison that the own-device version is newer than or equal to an other-device version that is newest among the plurality of other-device versions, the version management unit transfers the backup of the firmware, which is read out from the storage unit and corresponds to the own-device version, to all of display devices of which the other-device version is older than the own-device version among the plurality of display devices.
6. The display device according to claim 5, wherein only version information is first received from each of the plurality of the display devices to perform a version comparison with the own-device version.
7. A firmware updating method, comprising:
importing, from a plurality of control devices among a control device group including the own device and the plurality of control devices, other-device version information indicating an other-device version of firmware running on each of the plurality of control devices;
comparing an own-device version indicated by own-device version information stored in a storage unit with each of a plurality of other-device versions indicated by the imported other-device version information, the storage unit storing the own-device version information indicating a version of firmware that an own device has and a backup of the firmware that the own device has; and
requesting, when it is determined according to a result of the comparison that the other-device version of a first control device included in the plurality of control devices is newest among the plurality of other-device versions and the own-device version is older than the other-device version of the first control device, the first control device to transfer, to the own device and all of control devices of which the other-device version is older than the other-device version of the first control device among the plurality of control devices, firmware of which the other-device version is newest,
wherein, when it is determined according to the result of the comparison that the own-device version is newer than or equal to an other-device version that is newest among the plurality of other-device versions, the backup of the firmware, which is read out from the storage unit and corresponds to the own-device version, is transferred to all of control devices of which the other-device version is older than the own-device version among the plurality of control devices.

8. The firmware updating method according to claim 7, wherein only version information is first received from each of the plurality of the control devices to perform a version comparison with the own-device version.

* * * * *